Aug. 11, 1959  F. R. MERRIAM  2,899,510
PARKING SWITCH FOR WINDSHIELD WIPERS
Filed May 24, 1955  2 Sheets-Sheet 1

INVENTOR.
FRANK RICHARD MERRIAM

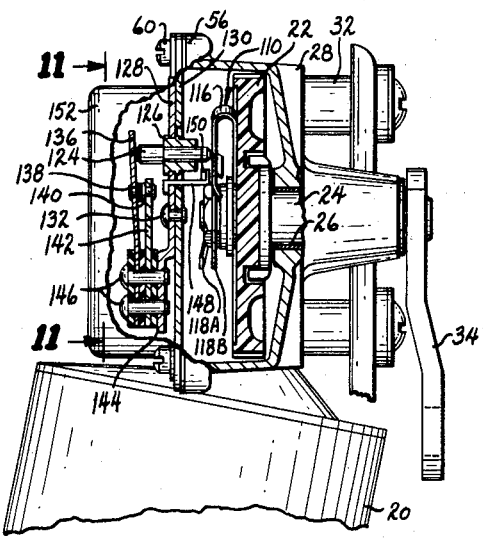
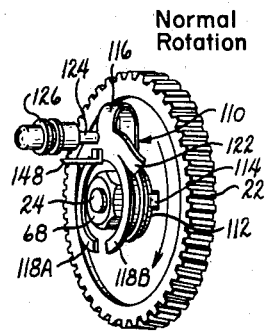
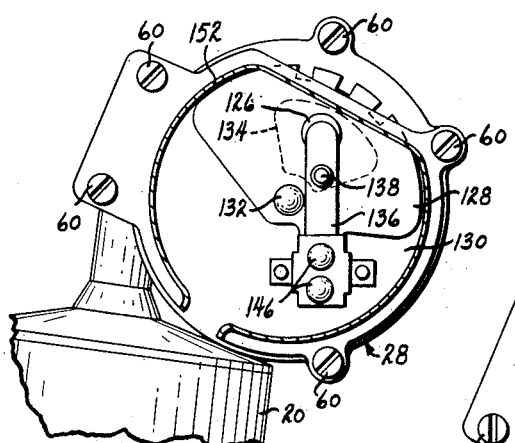
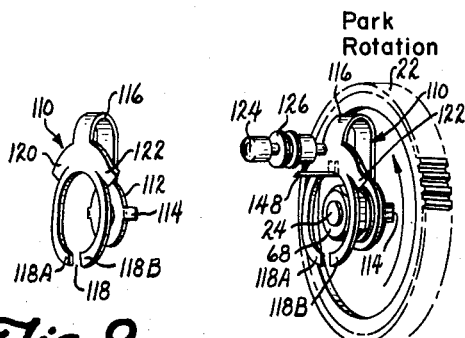
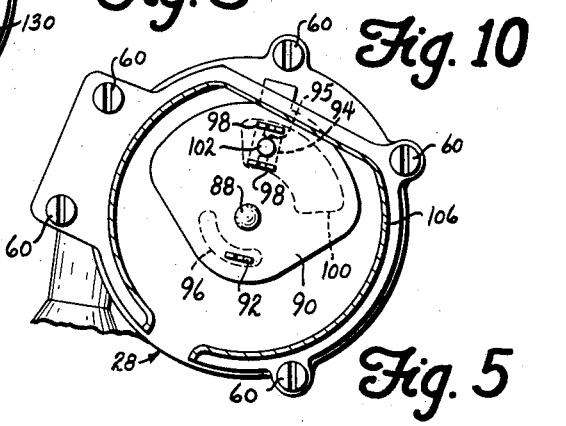

United States Patent Office 2,899,510
Patented Aug. 11, 1959

2,899,510

PARKING SWITCH FOR WINDSHIELD WIPERS

Frank Richard Merriam, Toledo, Ohio

Application May 24, 1955, Serial No. 510,741

8 Claims. (Cl. 200—61.39)

This invention relates to switches for electric windshield wipers, more particularly to switches controlling the power to the driving motor to stop the motor in parking condition.

This invention contemplates the provision of a switch which will cut off the power to an electric motor driving a pair of windshield wiper blades for parking, so that the wiper blades will be removed from the normal angle of oscillation to a parking position substantially parallel to the bottom edge of the windshield being wiped. In the normal operation of the windshield wiper, the motor rotates in one direction to oscillate the wiper blades over the windshield through a predetermined angle. Thereafter, if the operator wishes to stop the operation of the windshield wiper, he actuates a manual switch located on the dash, or other convenient place, which changes the circuit conditions of the motor, so that the motor reverses its direction of operation, at which time an automatic switch, which this invention contemplates providing, will become active to open the circuit to the motor when the wiper blades have attained their parking position substantially parallel to the bottom edge of the windshield.

It is, therefore, a principal object of this invention to provide a switch suitable for use with electric windshield wipers which, during normal operation of the windshield wipers, is inactive but becomes active when an operator changes the position of a manual switch to terminate the operation of the windshield wiper, at which time upon reversal of the motor brought about by the actuation of the manual switch by the operator, a second motor-actuated switch will become active to stop the motor at a predetermined position to park the windshield wiper blades against the bottom edge of the windshield beyond the normal angle of oscillation.

It is a further object of this invention to provide a motor actuated parking switch which is actuated by a spring member which overrides, when the active member is rotated in one direction but will become active when the active member rotates in the opposite direction to open a switch at a predetermined parking position to control the circuit to an electric windshield wiper.

It is a further object of this invention to provide a switch suitable for fabrication by mass production methods in a mass production line which is designed for use in connection with windshield wipers for use with automotive vehicles.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 5 is an elevational view taken along the line 5—5 of Fig. 2;

Fig. 7 is a sectional elevation showing the details of another modification of the invention;

Fig. 8 is an isometric view of the spring member which is the actuating portion of the switch;

Fig. 9 is an isometric view of the active members of the switch shown in normal operating relation;

Fig. 10 is a view similar to Fig. 9 with the direction of rotation of the parts reversed whereby the parking position is attained; and Fig. 11 is a view taken along the line 11—11 of Fig. 7.

Figure 1:
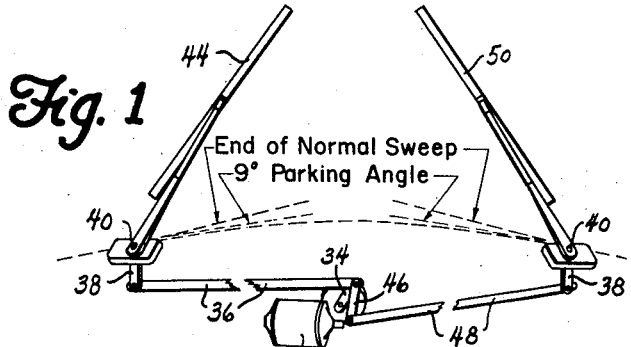
Fig. 1 is an isometric view of an electric windshield wiper illustrating the general arrangement of the cooperating parts.

Referring to the drawings, particularly to Fig. 1, an electric motor 20 is shown which is preferably a shunt wound motor provided with suitable connections for reversing its direction of rotation. The motor shaft is provided with a worm to drive a worm gear 22 in any well known manner, which also accomplishes a speed reduction in any suitable ratio. The worm gear 22 is preferably made of insulating material, such as nylon, and is affixed to a stub shaft 24 mounted in a bearing 26 forming a part of an enclosing casing 28. The casing is preferably made integral with the end head 30 of the motor casing and is provided with suitable mounting means 32 for affixing the whole motor assembly to the frame (not shown) of an automotive vehicle.

The outer projecting end of the shaft 24 is provided with a crank 34 affixed thereto and adapted to drive the crank to oscillate link 36 connected at its distal end to an arm 38 of a pivot shaft 40 which oscillates an arm 42 driving a wiper blade 44 over the surface of a windshield. The crank 34 is constructed with a second arm 46 to provide a compound crank arrangement, the second arm 46 driving a second link 48 which drives a second wiper blade 50 in a manner similar to that already described with reference to wiper blade 44.

Figure 2:
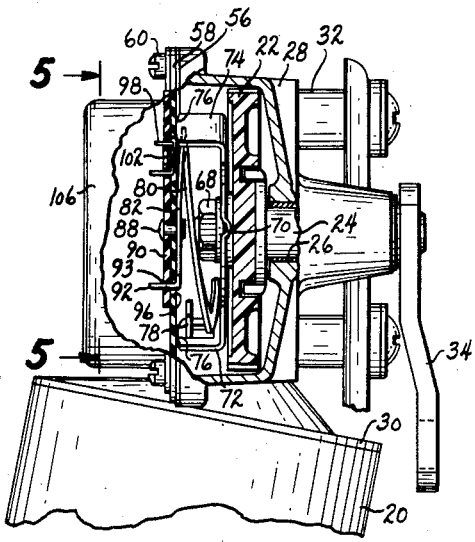
Fig. 2 is a sectional elevational view showing the operating parts of one form of the switch.
Figure 6:
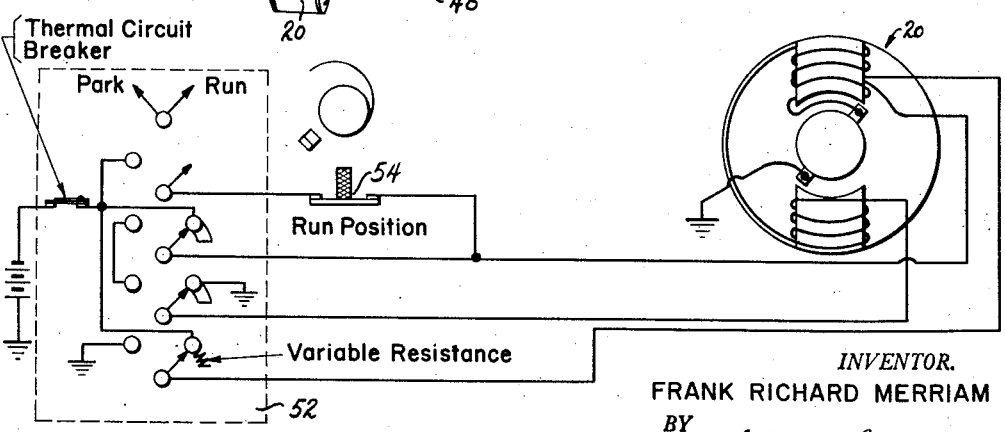
Fig. 6 is a schematic diagram of connections of an electric windshield wiper to which the invention has been applied.

The motor 20 rotates in a direction to move the crank 34 normally in a counterclockwise direction as viewed from the right in Fig. 2 which is obviously the same as the direction of rotation of the worm gear 22. This will move the wiper blades 44 and 50 through their normal angle of oscillation which normally ends about 9 degrees above the bottom edge of the windshield when the blades are moving toward each other. It is desirable, when the wiper blades are to be parked, to move them beyond the normal angle of oscillation, so that they will lay flat against the edge of the windshield as shown in the parked position in Fig. 1. In order to accomplish this, a manually-operable control switch 52 is provided (Fig. 6), which, when actuated, reverses the connections to the motor 20 to cause it to rotate in the opposite direction which will move the arm 34 in a clockwise direction as viewed before, until a motor-controlled switch 54 is operated by its selective control to open the circuits to the motor which then stops when the wiper blades 44 and 50 are in parked position outside of their normal sweep. The means which are selective to the direction of rotation of the gear 22, and which override when the gear rotates counterclockwise during normal operation but which become effective when the gear is rotated clockwise to operate switch 54, will now be described.

Referring now to Fig. 2, it will be noted that the worm gear, which is a driven member, is fabricated of nylon, an insulating material, and is mounted in the cup-shaped housing 28, terminating in a lip 56 over which is mounted a closure plate 58, also of insulating material, held in position thereon by screws 60. The plate 58 is, therefore, mounted in spaced parallel relation with the nylon gear 22, as shown, and in the space between the member, the active switch elements are mounted. Positioned on the forward face of the gear 22, and concentric therewith, a switch actuator member 62 is provided, which has rearwardly-struck lugs 64 adapted to interlock with sockets in the gear 22 to form a driving relation between the parts. Between the lugs 64, a ring-like central portion 66 is provided which fits around a nut 68 in spaced relation, therewith, provided on the shaft 24 to hold the gear thereon. Raised dimples 70 are provided at diametrically opposed points displaced 90 degrees from the lugs to contact the front face of the gear to provide a clearance space therebetween to allow a resilient displacement of the ends of the member 62 toward the gear. The ends of the members 62 are provided with forward-bent integral ears 72 and 74 in diametrically opposed relation with reference to the shaft 24 which contact the inner side of the insulating closure plate 58 by arcuate forward faces 76 to form a sliding relation therebetween as the member 62 is rotated by the gear. The dimensions of the parts are such that when the plate 58 is attached to the lip 56 of the housing 28 by the screws 60, the ears 72 and 74 are thrust toward the gear 22 to create a resilient displacement of the member 62 about the dimples 70. This holds the member 62 in position within the housing 28.

The switch actuating portion of the member 62 consists of an inwardly-struck lug 78 in the ear 72 which cooperates with a broken-ring resilient member 80, which is mounted in concentric relation with the member 62 and also the shaft 24 on which the gear 22 is mounted, by means of inwardly extending integral springy portion 82, which is bifurcated to lengthen the effective flexing span, and joined together again at the sides of a central integral hub portion 84, which is provided with an aperture 86 to form a journal on a rivet 88 mounted centrally of the plate 58 about which the whole element may be rotated for adjustment as will appear hereinafter.

On the outside of the plate 58, a second insulating plate 90 is provided also journaled on rivet 88 to rotate thereabout being interlocked with the broken-ring member 80 by an outwardly-struck lug 92 integral with the hub portion 84, which extends through a slot 93 in the plate 90 to project a substantial distance beyond to provide a terminal for connection into the motor control circuits. An arcuate clearance slot 96 is provided in the plate 58 to allow rotation of the plate 90 and the member 80 is interlocked by the lug 92 to allow for adjustment of the angular position of the member 80 with reference to the lug 78 on the actuating member 62. Diametrically opposite the lug 92, the plate 90 is provided with a U-shaped contact plate 94 keyed thereto by interlocking lug portions 95, as shown in Fig. 5, wherein one of the arms 98 of the contact plate extends outwardly a substantial distance to form a terminal element to which connecting leads may be soldered. The plate 58 is provided with another arcuate clearance slot 100 to accommodate the rotation of the plate 94, subtending the same angle as the slot 96 already described. The bottom of the U of the contact plate 90 has affixed to it contact point 102 to extend into the slot 100 to terminate in a plane substantially coplanar with the inside surface of the plate 58 where it aligns with another inner contact point 104 affixed in the member 80 at the point where the springy portion 82 joins the broken-ring element of the member 80. The contacts are normally in closed relation to complete an electrical circuit through the motor 20, but the contactual relation may be broken by moving the inner contact point 104 toward the gear 22 when a predetermined set of conditions of the elements obtain. These conditions will be described hereinafter.

Figure 3:
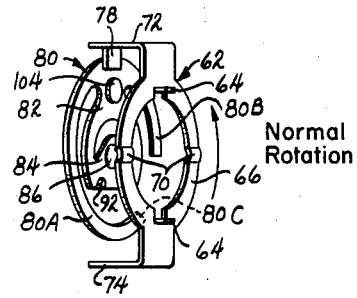
Fig. 3 is an isometric view of the active elements of the switch in operating relation showing the normal condition of the parts during operation.

The broken-ring element 80 is provided with a pair of perimeter elements 80A and 80B which form a broken ring separated by a blank space, as is best seen in Fig. 3. The shorter element 80B, which subtends an angle of about 90 degrees with relation to the contact point 104 positioned in the element 82, is disposed in the same plane as the element 82 and is, therefore, relatively flat in conformation. The second longer element 80A subtends an angle of approximately 200 degrees in the opposite direction from the element 80B also measured in relation to the contact point 104. The element 80A is bent out of the plane of the elements 82 and 80B, so that its tip 80C extends into the space between the plate 58 and the worm gear 22, as is best seen in Fig. 2. The tip 80C extends substantially to the right (Fig. 2) of the plane of the lug 78 with which both elements 80A and 80B are adapted to cooperate by being positioned within the orbit of the lug 78 as it is rotated by the actuator member 62 of which it forms an integral part. When the lug 78 is rotated in a counterclockwise direction, as shown in Fig. 3, it will contact the forward side of the broken-ring elements 80A and 80B and, therefore, override the element 80A, so that the position of the contact point will be unchanged and it will remain in its normal closed relation, so that the circuit conditions of the motor 20 will not be changed. This continues during the normal operation of the windshield wiper.

Figure 4:
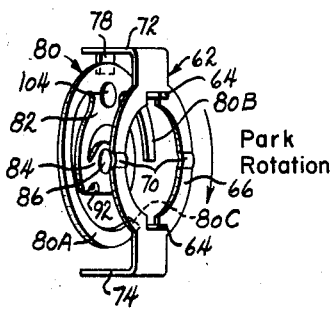
Fig. 4 is a view similar to Fig. 3 with the rotation of the spring reversed whereby the parts are placed in final parked position.

If the operator now wishes to stop the windshield wiper and to park the same in inoperative position, he will move the switch 52 to park position, which will first reverse the connections to the motor 20, so that it will rotate in the opposite direction. With the clockwise rotation of the worm gear 22, the actuating member 62, and its lug 78, the lug 78 will underride the tip 80C and the element 80A of the broken ring to engage the back side thereof as shown in Fig. 4. As the lug 78 approaches the vicinity of the contact 104, it will lift the broken ring 80 up into its plane and thereby flex the central spring portion 82 with the result that the contactual relation between the contacts 104 and 102 will be broken. This will break the power circuit to the motor 20 and it will coast to a stop. The relation between the link 36 and 48 and their driver cranks 34 and 46 will be changed by varying the effective length of the links whereby the wiper blades 44 and 50 will be parked beyond their normal angle of oscillation as shown in Fig. 1. These mechanisms are well known in the art, and will not be described further.

The point of opening of the contacts 102 and 104 by the action of the lug 78 can be adjusted by rotating the plate 90 on which both contacts are mounted about the rivet 88 until the wiper blades 44 and 50 park at the desired location. The plate 90 is then fixed in position by any convenient means. A housing 106 is provided to protect the switch elements from the weather, and may be attached to the main housing 28 by the screws 60.

In the modification shown in Figs. 7 to 11 inclusive, the worm wheel 22 has mounted on its forward face, a spring-actuating member 110 shown in perspective in Fig. 8. The member 110 is provided with a hub portion 112 which fits under nut 68 attaching the worm gear to the shaft 24, the hub portion being interlocked with the gear for rotation therewith by transversely-bent lugs 114 fitting into suitable sockets in the gear face. Integrally associated with the hub portion, a U-shaped springy element 116 is provided which is bent back over the hub portion, as shown, and terminates in a broken-ring construction 118 which has its center on the same axis of the hub, so that as the whole member is rotated by the gear 22, the broken ring will rotate on the same center. The ring 118 is broken in a diametrically opposed position with reference to the element 116 to form two arms 118A and 118B, which, when flexed, will clear each other at the break. The left arm 118A (Fig. 8) is bent forwardly out of the plane of the other arm 118B to provide selective engagement with an actuator element to be described hereinafter.

The spring element 110 is also provided with a pair of integral short arms 120 and 122 positioned outside of the perimeter of the broken-ring section 118 which are bent rearwardly at a slight angle to form ramps to actuate a reciprocating switch-actuating element 124, positioned in a bushing 126 affixed in an adjustable plate 128 mounted on a fixed closure plate 130 attached to the lip 56 of the housing 28 by screws 60 as already described with reference to the first modification. The adjustable plate 128 is attached to the fixed plate by a central rivet 132, the fixed plate being provided with an arcuate opening 134, through which the bushing 126 may extend into the space in the housing 28 whereby the headed pin or switch-actuating element 124 of insulating material such as nylon mounted therein may contact the spring member 110 in the rotative orbit of the short arms 120 and 122. The head of the element 124 cooperates with the leaf of a spring 136 on which a movable contact 138 is mounted to cooperate with a fixed contact 140 mounted on a relatively stiff bar 142. The spring 136 and the bar 140 are mounted in insulated relation on an ear 144 integrally associated with the adjustable plate 128 by rivets 146, so as to hold them in operable relation insulated from each other and from the casing.

The adjustable plate 128 is also provided with an inwardly projecting foot member 148 affixed in any convenient manner to the plate, and which projects through the aperture 134 in the plate 130 to position its obliquely-bent toe 150 into the rotative orbit of the broken-ring member 118 to cooperate therewith to operate the contacts 138 and 140 when predetermined conditions obtain which will now be described.

Referring to Fig. 9, it will be noted that with the gear 22 rotating in a clockwise direction when viewed from the front, the toe 150 of the foot 148 overrides the broken ring elements 118A and 118B, which allows the pin 124 to remain in depressed condition, so that the contacts 138 and 140 are in normally closed position which allows the windshield wiper to operate normally. When an operator actuates the motor switch 52 to park the wiper, the motor connections will first be reversed to change the direction of rotation of the gear 22 as shown in Fig. 10. The toe 150 will then pass under the bent-up portion 118A of the broken-ring member and underride the members to raise them up out of their normal plane substantially as shown. The short arm 120 will then pick up the pin 124 in its rotation and by the ramp-like arrangement will thrust the pin outwardly to open the contacts 138 and 140 which effects the cutting off of the power to the motor in a manner shown by switch 54 illustrated in Fig. 6. The same depressed parking arrangements for the wipers, as described in the first modification, are applicable.

It is desirable to protect the switch elements from the weather by applying a housing 152 over them in the well known manner, which may be attached to the main housing by using the same screws 60 already described. To start the motor 20 again, the manual switch 52 is moved to its original position which allows the motor to operate normally.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a switching device, a relatively fixed contact point, a relatively movable contact point in normally-closed relation with the fixed contact point, a rotatable member driven by a reversible electric motor, a resilient member driven by the rotatable member in a circular orbit being capable of deflecting into various transverse planes of rotation to move the movable contact point, a broken-ring element cooperating with the resilient member and rotating therewith symmetrically with said orbit and having one arm of the broken ring element bent out of its normal plane of rotation, a stationary actuating element cooperating with the broken-ring element on the resilient member, said actuating element overriding the bent portion of the broken ring in one direction of rotation, and in the opposite direction of rotation said actuating element underriding the bent-out portion to deflect the resilient member to a plane of rotation different from its normal plane of rotation, said movement of the resilient member being adapted to move the relatively movable contact point to change the normal relation of the contact points.

2. In a switching device, a relatively fixed contact point, a relatively movable contact point in normally-closed relation with the fixed contact point, a rotatable member driven by a reversible electric motor, a resilient member driven by the rotatable member in a circular orbit being capable of deflecting into various transverse planes of rotation to move the movable contact point, a resilient broken-ring element integral with the resilient member rotating symmetrically therewith having one end portion of the broken ring bent out of its normal plane of rotation, a stationary actuating element cooperating with the broken-ring element on the resilient member in its orbit to override the bent-out portion of the broken ring in one direction of rotation, and in the opposite direction of rotation said actuating element underrides the bent-out portion to deflect it and the resilient member in a plane different from its normal plane of operation, said movement of the resilient member being adapted to move the relatively movable contact point to open the contact points, and means to adjust the position of the actuating element to control the point of opening of the contact points.

3. In a switching device, a relatively fixed contact point, a relatively movable contact point in normally-closed relation with the fixed contact point, a rotatable member driven by a reversible electric motor, said member including an actuating element driven by the rotatable member in a circular orbit in a plane displaced from said rotatable member, and a relatively-fixed resiliently-mounted broken-ring element mounting the relatively movable contact point, having one end portion of the broken-ring element bent out of its plane into the plane of rotation of the actuating element on the rotatable member, said actuating element when rotated in one direction being adapted to override the bent end portion of the broken-ring element, but when its direction of rotation is reversed, said actuating element underrides the bent end portion of the broken ring to displace the broken-ring element out of its normal plane whereby said movable contact point is moved.

4. In a switching device, a relatively fixed contact point, a relatively movable contact point in normally-closed relation with the fixed contact point, a rotatable member driven by a reversible electric motor, said member including an actuating element driven by the rotatable member in a circular orbit in a plane displaced from said rotatable member, a relatively-fixed resiliently-mounted broken-ring element mounting the relatively movable contact point having one end portion of the broken-ring element bent out of its plane into the plane of rotation of the actuating element on the rotatable member, plate means mounting said fixed contact point and the broken-ring element, said actuating element when rotated in one direction being adapted to override the bent end portion of the broken-ring element, but when its direction of rotation is reversed, said actuating element underrides the bent portion of the broken ring to displace the broken ring out of its normal plane whereby said movable contact point is moved, and means for adjusting the plate means to control the point at which said contact points are separated.

5. In a device sensitive to direction of rotation, a pair of cooperating elements, one of which is capable of being rotated in opposite directions by a motor means, a first element having a resilient portion capable of being displaced axially of the axis of rotation of the rotating element by cooperating with the second element when the rotating element rotates in a predetermined direction, but which is not displaced when the rotating element rotates in the opposite direction, said second element having actuating means to cooperate with the resilient portions of first element to cause said axial displacement of the resilient portion when rotation occurs in the predetermined direction and said actuating means over-riding the resilient portion when rotation occurs in the opposite direction.

6. The device defined in claim 5 further characterized by a control switch which is actuated by the axial displacement of the resilient portion.

7. The device defined in claim 5 further characterized by rotating the first element having the resilient portion in both directions whereby the fixed actuating means of the second element causes the axial displacement of the resilient portion when the first element rotates in the predetermined direction.

8. The device defined in claim 5 further characterized by rotating the second element of the two cooperating elements with the first element stationary, so that its resilient portion is moved axially by the rotating actuating means on the second element.

References Cited in the file of this patent

UNITED STATES PATENTS

| | | |
|---|---|---|
| 2,103,287 | Howard | Dec. 28, 1937 |
| 2,513,247 | Morton | June 27, 1950 |
| 2,725,436 | Crocker et al. | Nov. 29, 1955 |
| 2,734,159 | Malone | Feb. 7, 1956 |
| 2,750,550 | Latta | June 12, 1956 |

FOREIGN PATENTS

| | | |
|---|---|---|
| 152,445 | Australia | July 13, 1953 |